United States Patent
Thomson et al.

(10) Patent No.: US 7,538,713 B1
(45) Date of Patent: May 26, 2009

(54) SYSTEM AND METHOD TO DETERMINE BURST TRANSMISSION TIMING FOR DATA COMMUNICATIONS USING RADAR

(75) Inventors: Larry S. Thomson, Bountiful, UT (US); William K. McIntire, Sandy, UT (US); David H. Robbins, Bountiful, UT (US); James J. Boesch, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 0 days.

(21) Appl. No.: 11/592,377

(22) Filed: Nov. 3, 2006

Related U.S. Application Data (60) Provisional application No. 60/733,859, filed on Nov. 3, 2005.

(51) Int. Cl.
*G01S 13/00* (2006.01)

(52) U.S. Cl. .............................. 342/57; 342/30; 342/58; 342/60

(58) Field of Classification Search ................ 342/57, 342/58, 60
See application file for complete search history.

(56) References Cited

U.S. PATENT DOCUMENTS

| | | | |
|---|---|---|---|
| 2,980,903 | A | 4/1961 | Hagopian et al. |
| 3,460,139 | A | 8/1969 | Rittenbach |
| 3,550,124 | A | 12/1970 | Heft et al. |
| 3,946,384 | A | 3/1976 | Westaway |
| 4,458,246 | A | 7/1984 | Filipsson et al. |
| 4,733,238 | A | 3/1988 | Fiden |
| 4,954,829 | A | 9/1990 | Fiden |
| 5,917,430 | A | 6/1999 | Greneker, III et al. |
| 6,285,681 | B1 * | 9/2001 | Kolze et al. ................. 370/442 |
| 6,396,586 | B1 * | 5/2002 | Wei et al. .................... 356/479 |
| 6,469,653 | B1 | 10/2002 | Haynes |
| 6,606,033 | B1 | 8/2003 | Crocker et al. |
| 6,616,611 | B1 * | 9/2003 | Moehring ................... 600/454 |
| 7,053,797 | B2 | 5/2006 | Taylor |
| 7,102,536 | B2 | 9/2006 | Scholz |
| 7,113,107 | B2 | 9/2006 | Taylor |
| 2001/0022558 | A1 * | 9/2001 | Karr et al. ................... 342/450 |
| 2003/0003874 | A1 * | 1/2003 | Nitta et al. ................. 455/67.1 |
| 2003/0156603 | A1 * | 8/2003 | Rakib et al. ................. 370/485 |
| 2004/0085938 | A1 * | 5/2004 | Tiedemann et al. ......... 370/335 |
| 2004/0120304 | A1 * | 6/2004 | Kloos et al. ................. 370/347 |
| 2004/0147269 | A1 * | 7/2004 | Kim ......................... 455/456.2 |
| 2004/0190597 | A1 * | 9/2004 | Cowie et al. ................ 375/138 |

(Continued)

*Primary Examiner*—Thomas H Tarcza
*Assistant Examiner*—Harry Liu
(74) *Attorney, Agent, or Firm*—Kirton & McConkie; William T. Ralston (57) ABSTRACT

A method for transmitting bursts of data from a communications terminal to a mobile radar transceiver having inter-burst periods is disclosed. The method includes determining a propagation time between the communications terminal and mobile radar transceiver. A length of inter-burst periods of the mobile radar transceiver having an inter-burst timing can be determined. Bursts of data having a communication burst period that is less than the inter-burst period can be formed. The bursts of data from the communications terminal can be transmitted at a transmission time based on the inter-burst timing and the propagation time to enable each burst of data to be received by the mobile radar transceiver during one of the inter-burst periods.

21 Claims, 5 Drawing Sheets

U.S. PATENT DOCUMENTS

2004/0266457 A1* 12/2004 Dupray .................... 455/456.5
2005/0025101 A1* 2/2005 Paneth et al. ................ 370/336
2006/0142913 A1* 6/2006 Coffee et al. ................. 701/35
2006/0183488 A1* 8/2006 Billhartz .................. 455/456.5
2006/0264185 A1* 11/2006 Jorgensen ................... 455/103
2006/0291537 A1* 12/2006 Fullerton et al. ............ 375/145

* cited by examiner

SYSTEM AND METHOD TO DETERMINE BURST TRANSMISSION TIMING FOR DATA COMMUNICATIONS USING RADAR

CROSS-REFERENCE TO RELATED APPLICATIONS AND CLAIM OF PRIORITY

Priority of U.S. Provisional patent application Ser. No. 60/733,859, filed on Nov. 3, 2005, is claimed, and is herein incorporated by reference in its entirety.

BACKGROUND

Advancements in broadband wireless communication have changed the way we live. People can now communicate and transfer information using techniques that were thought of only in science fiction literature a half century ago. A wide variety of communication resources is available for consumers, businesses, government, and military. For example, a typical consumer traveling in his car can communicate using his cell phone, listen to music over a virtually uninterrupted digital satellite radio signal while traveling cross country, receive broadband data at his computer over a WiMAX connection, and listen to a local traffic report using a high definition radio receiver.

Unfortunately, each of these means of communication typically requires the use of a separate antenna. It is very possible that a typical car, in the next 10 to 20 years, may include five to ten different antennas. Placement of that number of antennas on a car can be difficult, from both a stylistic and a functional point of view. Not only can the antennas appear unsightly, but they can also cause interference with other antennas, as well as requiring expensive wiring within the automobile between each antenna and its associated receiver.

Placement of antennas on commercial and military mobile platforms can be even more challenging. Even large military ships are often limited in the types of communication they can receive due to a lack of space available for associated antennas. Aircraft can be similarly limited. An aircraft designed to travel at high speeds may not have room for, or tolerance for an antenna designed for communicating high speed data over large distances. To overcome this problem, the military uses specialized ships and aircraft for transmitting and relaying information. While this solution generally works, it can be extremely expensive and can increase risk for soldiers in the battlefield.

SUMMARY

A method for transmitting bursts of data from a communications terminal to a mobile radar transceiver having inter-burst periods is disclosed. The method includes determining a propagation time between the communications terminal and mobile radar transceiver. A length of inter-burst periods of the mobile radar transceiver having an inter-burst timing can be determined. Bursts of data having a communication burst period that is less than the inter-burst period can be formed. The bursts of data from the communications terminal can be transmitted at a transmission time based on the inter-burst timing and the propagation time to enable each burst of data to be received by the mobile radar transceiver during one of the inter-burst periods.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

One method for overcoming the electrical, spatial, and/or mechanical limitations inherent in the use of multiple antennas on a single platform is to use an antenna for multiple purposes. For example, an antenna designed for transmitting and receiving radar bursts can also be used to transmit and receive data.

A mobile platform or fixed installation containing a radar system may not have a data communications system, or the existing communication system may be insufficient for the needs of the platform. Adding or upgrading a communication system typically entails adding hardware which incurs cost, adds weight, and involves modification of the platform structure (mounting antennas, for example). These additional requirements could be reduced or eliminated if components of the radar system could be exploited for use in data communications.

For example, an aircraft may be configured with a high performance radar which is capable of collecting synthetic aperture radar (SAR) images. Synthetic aperture radar can provide detailed, high definition images. Without a high bandwidth data link, these images typically cannot be downloaded from the aircraft until the aircraft has landed. The addition of a high-speed data communications link would allow the image to be downloaded to a ground or airborne platform, or transmitted to a satellite while the aircraft is still in flight.

A two way data link using a radar system can enable a mobile radar platform to both send and receive data. A two way data link can enable critical data to be transmitted to a mobile platform that otherwise lacks the ability to receive such data. The two way data link using a radar system may also provide a higher data rate link than other communications links on the mobile platform, enabling greater amounts of data to be received than is otherwise possible. Additionally, a two way data link can improve downlink communications from the mobile platform to a receiver by enabling communication between the radar system and the receiver, such as an acknowledgement that data sent by the radar was received by the receiver.

Some radar equipment (due, for example, to thermal constraints) cannot operate continuously, and is only capable of transmitting short bursts. This is true in the case of radars installed on certain aircraft today. The radar bursts, which can be as short as several hundred nanoseconds or as long as several hundred microseconds, can still be used to carry data despite the relatively short period of each burst. Ordinarily, data links configured to transmit large amounts of data use a continuous data signal. Transmitting large amounts of data using a bursted radar signal having short period bursts requires a different solution, since large data files, such as high definition photographs, cannot be transmitted over a single burst.

Figure 1:
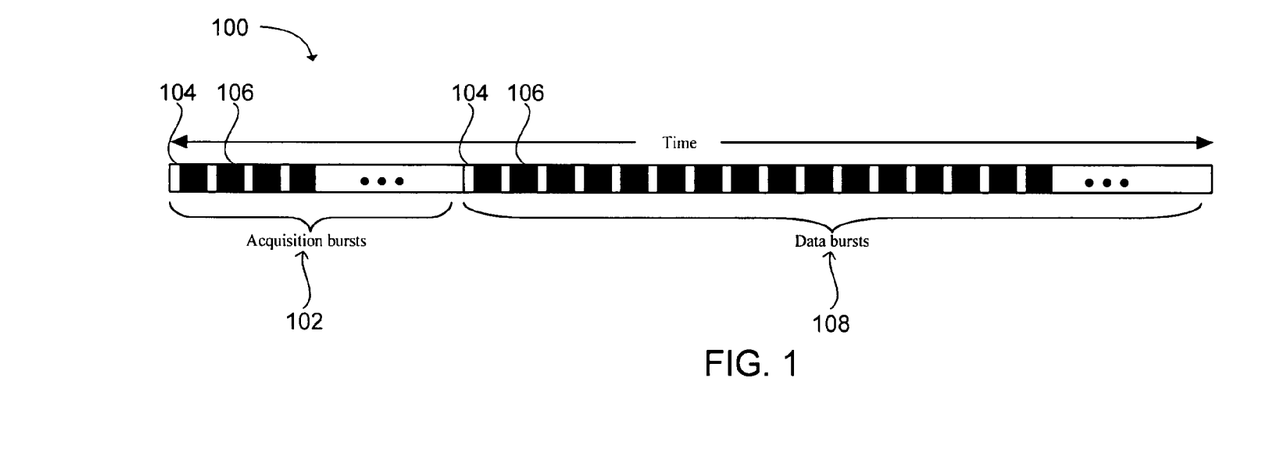
FIG. 1 is a block diagram illustrating a burst radar transmission comprising a continuous communication signal broken into segments in accordance with an embodiment of the present invention.

To transmit the continuous data signal in discrete bursts, the communication signal can be broken into segments. Each segment can be transmitted within the length of the transmit bursts. The maximum length of these bursts will usually be constrained by the radar RF hardware, such as the need for cooling. However, other constraints are also conceivable. Use of a substantially maximum length of each burst to transmit data can be desirable. This burst length, minus any guard intervals allowed at the beginning and end of the burst, can be used to determine the length of the communication signal segments. FIG. 1 shows an example of a burst radar transmission 100 comprising a continuous communication signal broken into segments.

The burst radar transmission 100 can be configured to carry data at high data rates. The transmission can include a plurality of bursts having a burst transmit period 104 followed by an inter-burst period 106 during which the radar equipment can cool. The inter-burst period can be several times as long as the transmit period. In one embodiment, the inter-burst period can be twice as long as the transmit period, though a range of ratios are possible, depending on the characteristics of the hardware and data link management issues, as can be appreciated.

The burst radar transmission can include one or more acquisition bursts 102. The acquisition bursts can include training sequences, frame synchronization sequences, and other sequences useful in synchronizing a receiver with the burst transmissions. The acquisition burst(s) can be followed by payload (data) bursts, configured to carry data at relatively high rates. This is discussed more fully in the copending application, Ser. No. 11/592,536 (now U.S. Pat. No. 7,423,577), titled "System and Method for Transmitting High Data Rate Information from a Radar System", which is herein incorporated by reference in its entirety.

Synchronization with Radar Hardware

A modem is typically used to modulate data onto a carrier signal to form a communication signal. It is convenient if the modem is able to control the timing of the transmit periods in the RF hardware. This way, synchronization of the communication signal segments with the radar burst transmit periods 104 is easily accomplished. In some cases, however, this is not possible. Certain modern radar systems in use today present just such a case, wherein the radar cannot accept control of the transmit periods from an external source. In this case, the radar hardware can provide some sort of gate signal so that the modem can know the timing of the transmit burst periods. The radar hardware may also provide a reference clock signal to which the gate signal is synchronized.

Figure 2:
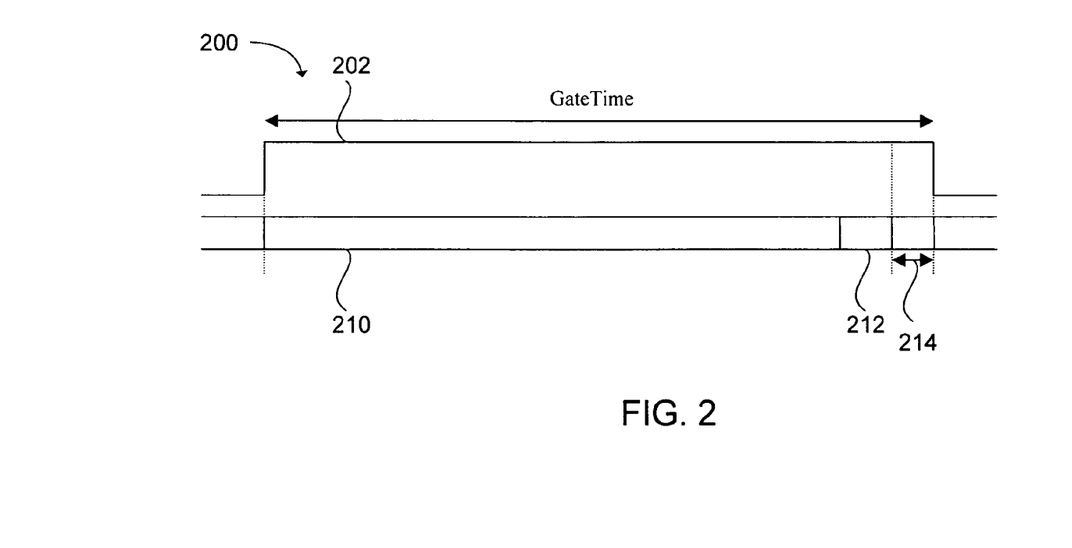
FIG. 2 is a block diagram illustrating a burst radar transmission comprising an acquisition signal segment in accordance with an embodiment of the present invention.

FIG. 2 shows one embodiment of a gate signal 202. The gate signal 202 can be provided by the RF hardware to the modem. An acquisition signal segment 200 can be synchronized to the gate signal. The gate signal may be continuously provided by the RF hardware to the modem. Alternatively, a reference clock can be provided by the radar radio frequency equipment (RFE) or some other source within the RF hardware. The gate signal can be made synchronous with this reference clock signal. The communications modem can therefore use this clock for a reference, and upon receiving any gate signal rising edge, the modem can predict future rising and falling edges by counting clock cycles, without the need for further gate signal detection.

The acquisition signal segment 200 can include an idle sequence 210 that can be transmitted during the acquisition burst to enable carrier and symbol acquisition. The idle sequence can be a sequence well suited for rapid acquisition, such as an alternating +1, −1 sequence, or some other alternating sequence configured to enable rapid acquisition. Additionally, a stop frame sync word 212 can be included at the end of the acquisition burst to signal an end of the burst. A separate communications terminal, at which the acquisition signal is received, can acquire the burst timing by detecting the stop frame sync word. A guard period 214 can be located between the stop sequence and the end of the acquisition burst. The guard period can be just long enough to ensure that the tail of the data doesn't get clipped.

The radar system can be configured to receive data and/or radar signals during the inter-burst period 106 (FIG. 1). For example, radar bursts can be transmitted during the radar burst transmit periods 104. Reflections from the radar bursts can be received during the inter-burst periods. Alternatively, data can be transmitted during the radar burst transmit periods and data can be received during the inter-burst periods that has been transmitted from the separate communications terminal. However, as previously discussed, the modem may have no control over the timing of the inter-burst periods. The modem may only be able to receive data during the inter-burst period. Thus, any information that is transmitted from a separate communications terminal to the radar system transceiver is typically received only during the inter-burst periods.

Figure 3:
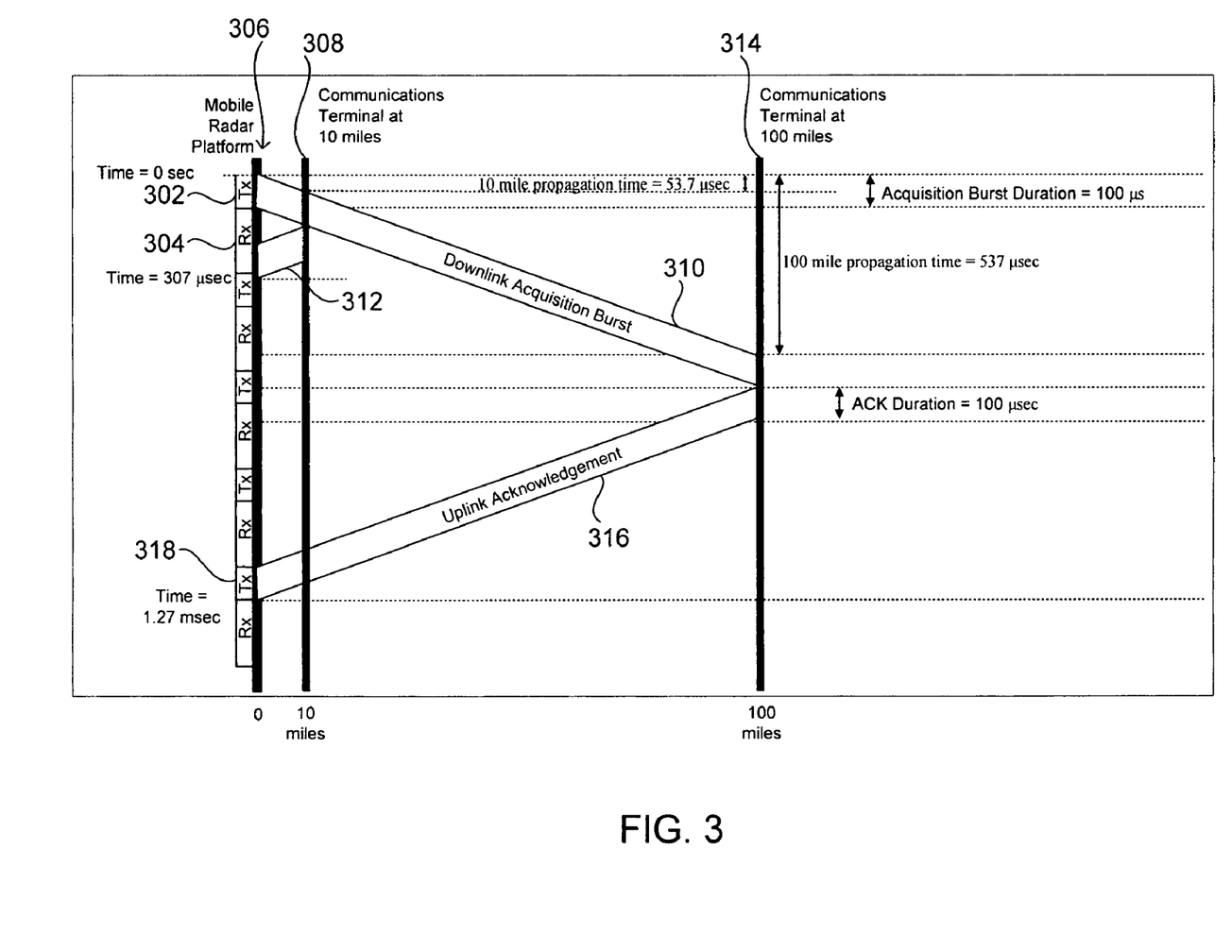
FIG. 3 is an illustration showing the difficulty of transmitting a signal from a mobile radar platform to a communications terminal and transmitting a signal back to the radar platform to be received during an inter-burst period in accordance with an embodiment of the present invention.

For example, FIG. 3 is an example diagram depicting the difficulty of achieving two way communications between a mobile radar transceiver having an inter-burst period and a separate communications terminal. The left axis shows transmit periods 302 and receive periods 304 (inter-burst periods) as time progresses. The transmit period is shown to be 100 μs followed by a 200 μs receive period in this example. A 100 μs communication burst can be transmitted from the mobile radar transceiver 306 to a communications terminal 308 that is located approximately 10 miles from the radar transceiver. The communication burst, such as an acquisition burst 310, will take approximately 53.7 μs to travel the 10 miles through the atmosphere to the communications terminal, as can be appreciated. The communications terminal is shown immediately responding, after receiving the acquisition burst, with a 100 μs acknowledgement burst 312. It can be seen that the acknowledgement burst will be received at the radar transceiver (53.7 μs after leaving the communications terminal), with a portion of the acknowledgement burst arriving during the following transmit period. Specifically, the diagram shows the acknowledgement burst arriving at the radar transceiver between 207 µs and 307 µs after the start of the acquisition signal. The last 7 µs of the acknowledgement burst will arrive during a transmit period, at which point the radar transceiver may not be able to receive the signal.

Similarly, if the 100 µs acquisition burst 310 is sent from the mobile radar transceiver 306 to a communications terminal 314 that is located approximately 100 miles from the transceiver, the propagation time is 537 µs. A substantially immediate response of a 100 µs acknowledgement burst 316 by the communications terminal takes 537 µs to return to the radar transceiver, arriving between 1.17 ms and 1.27 ms after the start of the acquisition signal, with substantially all of the signal arriving during the 1.20 ms to 1.30 ms transmit period 318. In accordance with one aspect of the invention, it has been recognized that a system and method is needed for transmitting bursts of data from a communications terminal to a mobile radar transceiver having inter-burst periods.

Figure 4:
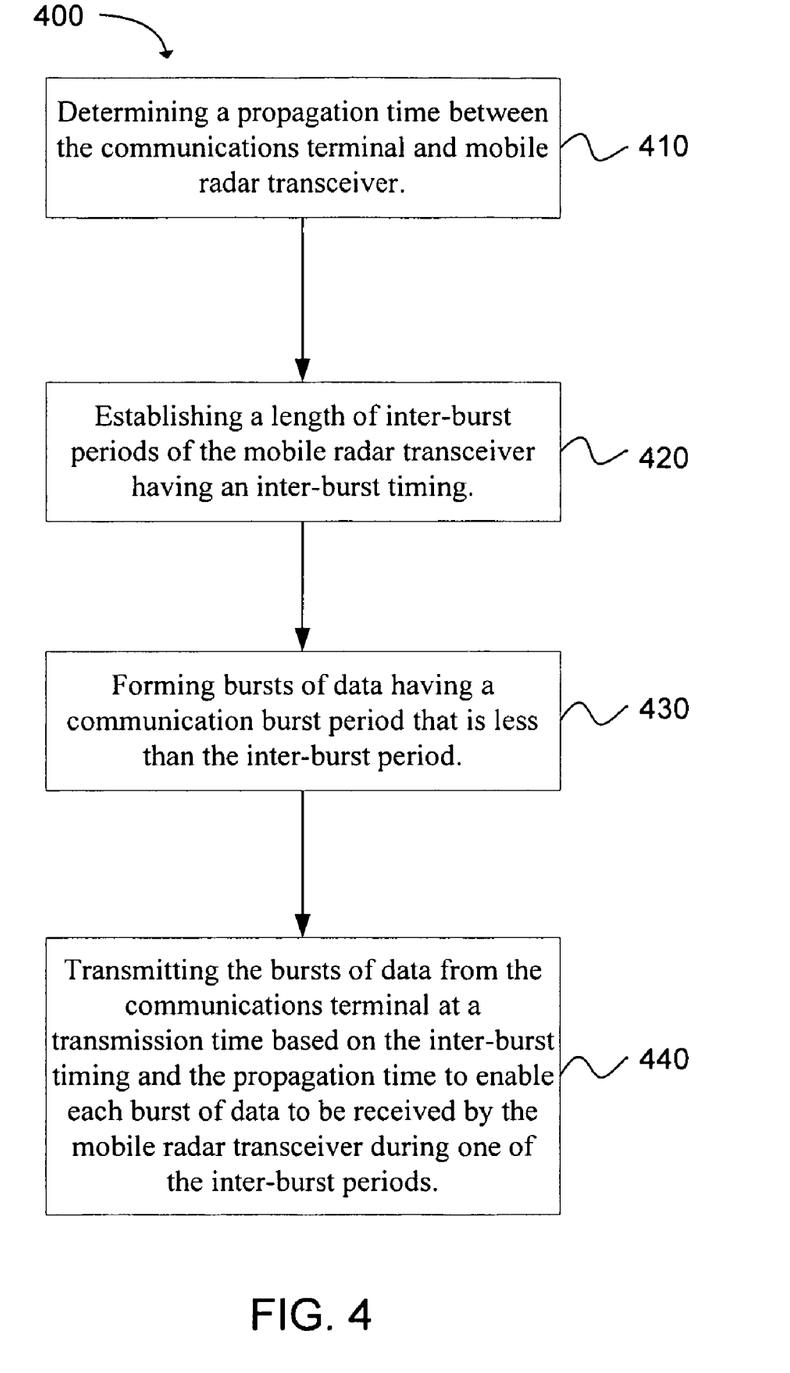
FIG. 4 is a flow chart depicting a method of transmitting bursts of data from a communications terminal to a mobile radar transceiver having inter-burst periods in accordance with and embodiment of the present invention.

There are a variety of methods for assuring that data transmitted from the separate communications terminal to the radar system transceiver can be received during the inter-burst periods of the mobile radar transceiver. In one embodiment, a flow chart depicting a method 400 of transmitting bursts of data from a communications terminal to a mobile radar transceiver having inter-burst periods is shown in FIG. 4. The mobile radar transceiver can be located on an aircraft, helicopter, lighter than air ship, ship, ground based vehicle, or other types of mobile radar platform having a limited amount of space for placement of antennas. The communications terminal can be a wireless transmitter or transceiver configured to transmit data to the mobile radar transceiver. The communications terminal and mobile radar transceiver can be configured to transmit and receive on a carrier signal centered at substantially the same frequency. Alternatively, a different carrier frequency can be used to transmit than is used to receive.

The method includes the operation of determining a propagation time between the communications terminal and mobile radar transceiver, as shown in block 410. For example, a position, speed, and trajectory of the mobile radar transceiver relative to the communications platform can be determined. The position, speed, and trajectory information may be determined using a global positioning satellite receiver, an inertial navigation system, a star tracker, and the like. The information can then be transmitted from the mobile radar transceiver to the communications terminal. The information can be transmitted using the radar transceiver. Alternatively, a location transmitter comprising a separate antenna can also be used to transmit the information from the mobile radar transceiver to the communications terminal. With knowledge of the position, speed, and trajectory of the mobile radar relative to the communications platform, a propagation time can be determined based on the time it takes for a signal to be transmitted between the radar and communications terminal.

In another embodiment, the position and trajectory of the mobile radar transceiver can be determined using a separate radar coupled to the communications terminal. The radar can be located adjacent the communications terminal, or in a separate location while being in contact with the communications terminal. The separate radar can be used to track the position, speed, and trajectory of the communications terminal. The propagation time can be determined based on the distance and velocity of the mobile transceiver as detected by the separate radar. Alternatively, the separate radar can directly detect the propagation time of a signal transmitted between the radar and communications terminal. The propagation time can be approximately one half the time it takes for a radar signal to be transmitted from the separate radar and reflected back to the radar from the mobile radar transceiver. This propagation time can be directly used at the communications terminal without converting the propagation time to a distance between the communications terminal and radar.

The method 400 (FIG. 4) further includes the operation of establishing a length of inter-burst periods of the mobile radar transceiver having an inter-burst timing, as shown in block 420. Once the propagation time between the communications terminal and mobile radar transceiver is determined, the information can be used to enable the communications terminal to transmit a burst of data that will arrive at the mobile radar transceiver at a predetermined time. However, in order for the entire burst transmitted from the communications terminal to arrive at the mobile radar during an inter-burst period, a knowledge of the mobile radar's inter-burst period timing is needed.

In one embodiment, the inter-burst timing can be determined at the communications terminal by receiving two or more bursts from the mobile radar transceiver. The timing of the inter-burst periods can then be determined at the communications terminal based on the timing of the inter-burst period(s) that occur between the two or more bursts. A clock reference at the communications terminal can be used to track the inter-burst timing of the inter-burst periods. Using the propagation delay and knowledge of the inter-burst timing, one or more bursts of data can be transmitted from the communications terminal that will arrive at the mobile radar transceiver during the inter-burst period(s).

If the mobile transceiver and the communications terminal are both static, then the propagation delay between them will remain constant. However, if one or both are moving relative to one another, then the propagation delay can be updated to compensate for changes in distance. The propagation delay can be actively updated based on continuously received information of the mobile radar transceiver's location with respect to the communications terminal.

Alternatively, knowledge of the mobile radar transceiver's location, speed, and trajectory can allow the communications terminal to project future locations of the mobile radar transceiver's, and adjust the transmission timing of the bursts of data to account for changes in propagation delay due to the mobile radar transceiver's changing position relative to the communications terminal. The mobile radar transceiver can transmit a change in speed or trajectory to the communications terminal, rather than continuously transmitting location and trajectory information.

In another embodiment, the inter-burst timing of the inter-burst periods can be determined based on the use of a common clock reference. For example, the transmit burst timing and inter-burst periods can be set to start at a specific time, such as 12:00 AM. A common clock reference, such as a clock reference received from a global positioning satellite (GPS) can be used to determine the inter-burst timing with respect to the start time. The clock reference received from the GPS can be accurate to within several nanoseconds. This accuracy can enable the inter-burst timing of the mobile radar transceiver to be determined at the communications terminal. Use of a common clock reference can eliminate the need to transmit radar or communications bursts from the radar transceiver in order to determine inter-burst timing at the communications terminal.

In another embodiment, a radar clock reference can be transmitted from the mobile radar transceiver to the communications terminal. The radar clock reference can be a clock reference at the mobile radar transceiver associated with the inter-burst timing. The radar clock reference can be transmitted using either the radar transceiver or a separate antenna.

The transmitted clock reference can be received at the communications terminal. The inter-burst timing can be communicated to the communications terminal based on the transmitted clock reference. For example, the radar clock reference may be associated with the burst transmission timing and the inter-burst period timing. A communications terminal clock reference can then be substantially synchronized with the transmitted clock reference to enable the inter-burst timing to be determined at the communications terminal.

Figure 5:
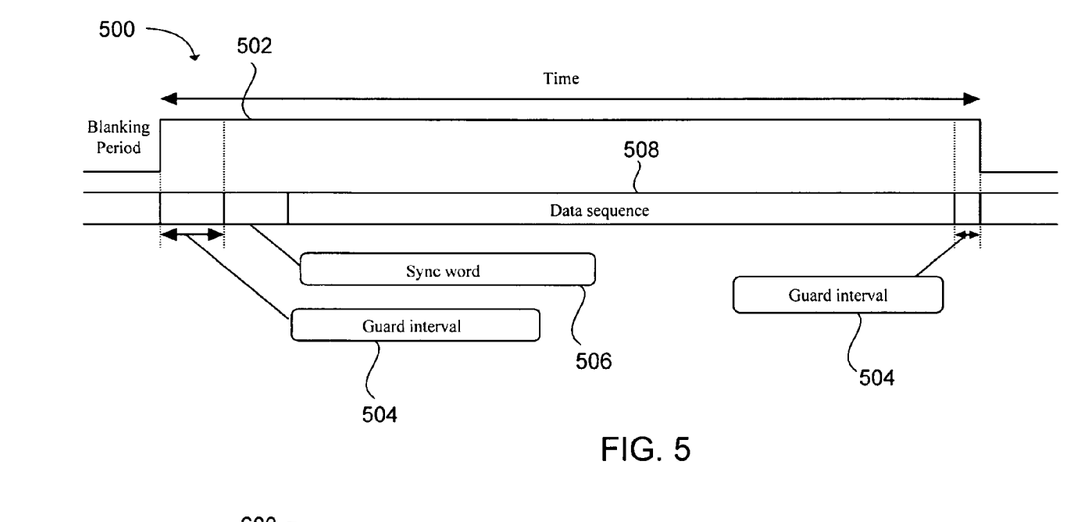
FIG. 5 is a block diagram illustrating a system for transmitting bursts of data from a communications terminal to a mobile radar transceiver having inter-burst periods in accordance with an embodiment of the present invention.

The method 400 includes the further operation of forming bursts of data having a communication burst period that is less than the inter-burst period, as shown in block 430. Knowledge of the inter-burst timing of the mobile radar transceiver and the amount of propagation delay between the mobile radar transceiver and the communications terminal can enable a communication signal segment 500 of data 508 transmitted from the communications terminal to have a burst length substantially equal to the inter-burst periods 502 of the mobile radar transceiver, as shown in FIG. 5. Maximizing the burst length transmitted from the communications terminal can increase the amount of data that can be transmitted to the mobile radar transceiver during the inter-burst periods. In any case, the burst length can be greater than half of the inter-burst period length.

The communication signal segment 500 can include guard intervals 504 at the beginning and end of the burst, a synchronization sequence comprising a sync word 506, and the data sequence 508. The guard intervals may be of identical lengths at the beginning and end of each burst, or alternatively, the intervals may have different lengths. The guard periods can be added to allow for inaccuracies in inter-burst timing and propagation delay to guard against clipping of data as the mobile radar transceiver shifts between transmit and blanking modes. A guard period at the beginning of the burst can be used to enable a power amplifier in the receiver of the communications terminal to become substantially stable prior to data being detected. The actual length of the guard periods is dependent on the design of the receiver and the length of the inter-burst periods. Alternatively, the guard intervals at the beginning and/or ending of the communication signal segment may be omitted.

A synchronization sequence, or sync word 506, can be used to enable the radar transceiver to become synchronized with the received communication signal segment. The sync sequence can be kept relatively short to minimize the amount of overhead in the communication signal segment.

The method 400 (FIG. 4) further comprises the operation of transmitting the bursts of data from the communications terminal at a transmission time based on the inter-burst timing and the propagation time to enable each burst of data to be received by the mobile radar transceiver during one of the inter-burst periods, as shown in block 440. Paradoxically, the higher the rate at which data is transmitted, the more efficient the transmission of data can be using brief radar bursts as carriers. For example, for a communications terminal burst duration having a length of 25 microseconds, the following data rate statistics, which assume QPSK modulation, can be derived:

Example #1: High Rate

Data rate: 274 Mbps

Symbol rate: 137 Msymbols/sec

Burst duration: 25 microseconds

Burst size: 3425 symbols

Sync word length: 16 symbols

Sync word fraction of burst: 0.5%

Example #2: Medium Rate

Data rate: 10 Mbps

Symbol rate: 5 Msymbols/sec

Burst duration: 25 microseconds

Burst size: 125 symbols

Sync word length: 16 symbols

Sync word fraction of burst: 12.8%

Example #3: Low Rate

Data rate: 1.28 Mbps

Symbol rate: 640 ksymbols/sec

Burst duration: 25 microseconds

Burst size: 16 symbols

Sync word length: 16 symbols

Sync word fraction of burst: 100%

Example #4: Even Lower Rate

Data rate: 80 kbps

Symbol rate: 40 ksymbols/sec

Burst duration: 25 microseconds

Burst size: 1 symbol

Sync word length: Doesn't matter

Sync word fraction of burst: Much longer than a burst

It is shown that a rate of greater than 1.28 Mbps is required to transmit any data beyond a 16 bit sync word on a 25 microsecond burst. At relatively high rates, such as 274 Mbps, the amount of overhead devoted to synchronization, about 0.5%, becomes relatively insubstantial. Thus, to transfer large data files, such as SAR image files, over a reasonable amount of time, a relatively high data rate is needed to minimize the amount of overhead in each burst that is used to synchronize a receiver to the signal.

Transmitting at a high data rate, however, typically entails the design of a system configured to transmit a signal having a relatively high signal to noise density ratio. A communication signal should have a sufficient amount of energy in each bit transmitted to enable the receiver to distinguish between received symbols. Thus, as the rate of bits transmitted increases, so should the amount of power. Transmitting a communication signal at a rate of 274 Mbps can use over 200 times more power than transmitting at a rate of 1.28 Mbps when all other system variables are held constant. Therefore, the communications terminal typically uses a fairly large amount of power when transmitting at high data rates.

High data rates may be desired when transferring high definition images to a mobile platform using the radar transceiver to receive the data during the inter-burst periods. For example, a high resolution map may be transferred to the platform. The map can be used to enable a person to direct the mobile platform to a desired location or relay other kinds of desired information.

Alternatively, a lower data rate may be used to transmit information to the mobile radar transceiver. In many situations, it is not necessary to transmit a large amount of data to a mobile platform using the radar transceiver to receive the data. A lower power communications terminal having reduced complexity and cost can be used to transmit information at lower data rates, such as 10 Mb/s. In the above examples, a 10 Mb/s transmit rate allows information to be transmitted in 25 microsecond bursts with 16 bit sync words with about 13% overhead dedicated to the sync word. This amount of overhead may be reasonable based on the amount of data that is typically transmitted to the mobile radar transceiver.

Longer burst transmit periods and inter-burst periods can be employed in the radar transceiver, such as the 100 microsecond burst periods 302 and 200 microsecond inter-burst periods 304 shown in FIG. 3, enabling the amount of overhead devoted to sending a sync signal to be significantly decreased. For example, for an inter-burst period of 200 microseconds, a 10 Mb/s signal can transmit up to 1000 symbols. Using a 16 bit sync word amounts to a 1.6% overhead dedicated to the sync word. The actual lengths of the inter-burst periods can vary from several hundred nanoseconds to several hundred microseconds, depending upon the selected hardware in the radar transceiver and data link management issues, as can be appreciated.

In another embodiment, the mobile radar transceiver may be used as a relay, enabling direct line of sight transmission where it was otherwise unavailable. For example, the communications terminal can send data to a mobile radar transceiver located on a platform such as an airplane or lighter than air ship. The data can be received during the inter-pulse periods and then re-transmitted by the mobile radar transceiver to an additional receiver. The additional receiver may not be within range of the communications terminal or may not be within a line of sight. Thus, the mobile radar transceiver can be used as a relay by the communications terminal to transmit a message to the additional receiver that the terminal was otherwise unable to communicate with.

Figure 6A:
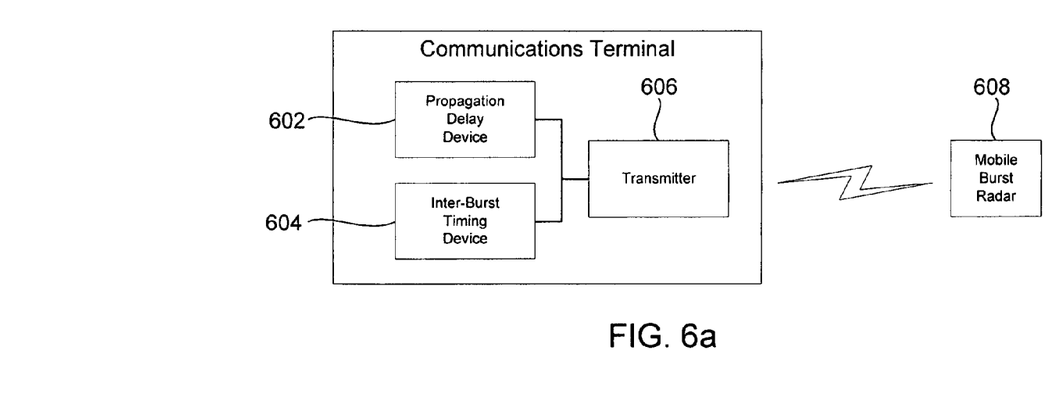
FIG. 6a is a block diagram of a system for determining inter-burst timing for data communications of a mobile burst radar in accordance with an embodiment of the present invention.

An additional embodiment provides a system for determining inter-burst timing for data communications of a mobile burst radar. The system comprises a communications terminal 600, as shown in FIG. 6*a*. The communications terminal includes a propagation delay device 602. The propagation delay device can be used to determine a propagation time between the mobile burst radar 608 and the communications terminal. The communications terminal can also include an inter-burst timing device 604 that can determine a timing of the burst transmissions of the mobile burst radar. A transmitter 606 can receive information from the propagation delay device and the inter-burst timing device and can use the information to transmit a burst of data to be received by the mobile burst radar during the inter-burst period. The data burst can be transmitted with a timing so that it is received during an inter-burst period. The timing can be determined using information received from the propagation delay device and the inter-burst timing device.

Figure 6B:
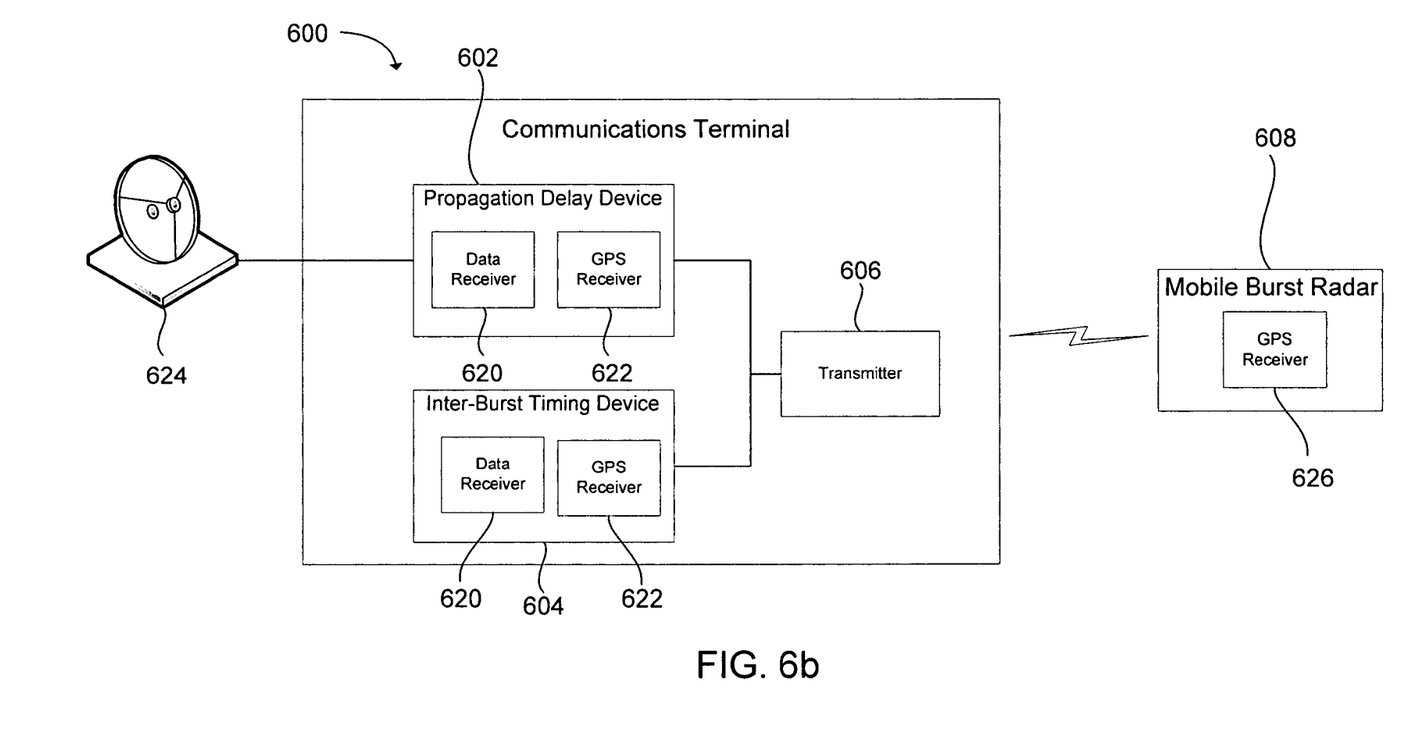
FIG. 6b is a block diagram of a more detailed system of FIG. 6a in accordance with an embodiment of the present invention.

Determining the propagation time between the communications terminal 600 and the mobile burst radar 608 can be accomplished in a number of ways, as has been previously discussed. For example, the propagation delay device 602 can include a global positioning satellite (GPS) receiver 622 that is capable of determining a position of the communications terminal 600, as shown in FIG. 6*b*. The propagation delay device can receive 620 information from the mobile burst radar 608 associated with a position of the mobile burst radar. The propagation delay can be determined based on the distance between the radar and the communications terminal positions, as can be appreciated.

Alternatively, a separate radar 624 coupled to the propagation delay device 602 can be used to determine the propagation delay between the mobile burst radar 608 and the communications terminal 600. The separate radar can send the propagation delay to the propagation delay device.

The inter-burst timing device 604 can determine timing of the burst transmissions from the mobile burst radar 608 by receiving 620 at least two radar bursts from the mobile burst radar. The inter-burst period is the period between the two radar bursts. With a knowledge of the timing and length of the radar bursts, and the inter-burst period between the two bursts, a clock reference within the communications terminal can be synchronized to the inter-burst period timing to enable the communications terminal to have a knowledge of the inter-burst timing without continuously receiving burst signals from the mobile burst radar.

In another embodiment, a common clock reference between the mobile burst radar 608 and the communications terminal 600 can be used to determine the inter-burst timing. For example, the inter-burst timing device 604 can be coupled to the GPS receiver 622. The GPS receiver can receive a clock signal from a plurality of global positioning satellites. Similarly, the mobile burst radar can include a GPS receiver 626 that also receives a clock signal from a plurality of global positioning satellites. The two clock references can be accurate to within a tolerance of several nanoseconds. The accuracy enables the separate clock references to act as a common clock reference. A knowledge that the inter-burst timing of the mobile burst radar started at some arbitrary time, along with a prior knowledge of a length of the inter-burst periods and burst periods can be used at the communications terminal in combination with the common clock reference to determine start and stop times of the inter-burst periods of the mobile burst radar.

Alternatively, a reference clock from the mobile burst radar 608 can be transmitted 620 to the inter-burst timing device. A clock at the inter-burst timing device can be substantially synchronized to the transmitted clock reference. As above, a knowledge that the inter-burst timing of the mobile burst radar started at some arbitrary time, along with a prior knowledge of a length of the inter-burst periods and burst periods can be used in combination with the common clock reference to determine start and stop times of the inter-burst periods.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of transmitting bursts of data from a communications terminal to a mobile radar transceiver having inter-burst periods, comprising:
   determining a propagation time between the communications terminal and the mobile radar transceiver;
   establishing a length of inter-burst periods of the mobile radar transceiver having an inter-burst timing;
   forming bursts of data having a communication burst period that is less than the inter-burst period;
   transmitting the bursts of data from the communications terminal at a transmission time based on the inter-burst timing and the propagation time to enable each burst of data to be received by the mobile radar transceiver during one of the inter-burst periods;
   receiving at the mobile radar transceiver during one of the inter-burst periods a burst of data from the communications terminal; and receiving at the mobile radar transceiver during a different one of the inter-burst periods a reflection of a radar pulse transmitted from the mobile radar transceiver.

2. A method as in claim 1, wherein determining the propagation time further comprises transmitting a position and trajectory of the mobile radar transceiver to the communications terminal using the mobile radar transceiver.

3. A method as in claim 1, wherein determining the propagation time further comprises transmitting a change in at least one of trajectory and speed of the mobile radar transceiver to the communications terminal.

4. A method as in claim 1, wherein determining the propagation time further comprises transmitting a position and trajectory of the mobile radar transceiver to the communications terminal using a location transmitter.

5. A method as in claim 1, wherein determining the propagation time further comprises measuring the propagation time between the communications terminal and the mobile radar transceiver using a separate radar located about the communications terminal.

6. A method as in claim 1, wherein establishing the inter-burst period timing further comprises transmitting at least two radar bursts from the mobile radar transceiver to the communications terminal, wherein the at least two radar bursts are separated by the inter-burst period to enable the communications terminal to determine a start time for the inter-burst period.

7. A method as in claim 6, wherein transmitting the at least two radar bursts further comprises transmitting at least two radar bursts, wherein the radar bursts include data modulated onto the radar bursts to form modulated radar burst signals.

8. A method as in claim 1, wherein establishing the inter-burst period timing further comprises transmitting a radar clock signal from the mobile radar transceiver to the communications terminal, wherein the radar clock signal is used to determine a start time for the inter-burst periods.

9. A method as in claim 1, wherein establishing the inter-burst period timing further comprises using a common clock reference for the communications terminal and the mobile radar receiver to enable the communications terminal to determine a start time for the inter-burst periods.

10. A method as in claim 9, wherein the common clock reference is a clock reference received from a plurality of global positioning satellites.

11. A method as in claim 1, wherein forming bursts of data further comprises forming bursts of data having a communication burst period that is substantially equal to the inter-burst period.

12. A method as in claim 11, further comprising adding a guard period to at least one of a beginning and an end of the communication burst period.

13. A method as in claim 1, wherein forming bursts of data further comprises forming bursts of data having a communication burst period length that is greater than half of the inter-burst period.

14. A method as in claim 1, wherein transmitting the bursts of data further comprises relaying the bursts of data by re-transmitting the bursts of data with the mobile radar transceiver to an additional receiver.

15. A method as in claim 1, further comprising adding a sync word to the burst of data transmitted from the communications terminal to enable a clock reference at the mobile radar transceiver to be substantially synchronized with the burst of data.

16. A method as in claim 1, wherein transmitting the bursts of data further comprises transmitting the bursts of data having burst lengths less than 500 microseconds.

17. A method as in claim 1, wherein transmitting the bursts of data further comprises transmitting the bursts of data having burst lengths less than 25 microseconds.

18. A method as in claim 1, wherein transmitting the bursts of data further comprises transmitting the bursts of data having at least 1500 symbols modulated onto each burst of data.

19. A method as in claim 1, wherein transmitting the bursts of data further comprises transmitting the bursts of data having at least 300 symbols modulated onto each burst of data.

20. A system for transmitting bursts of data from a communications terminal to a mobile radar transceiver, comprising:
a propagation delay device to determine a propagation time between the mobile burst radar and a communications terminal;
an inter-burst timing device to establish timing and length of inter-burst periods of the mobile burst radar;
a transmitter disposed in the communications terminal and coupled to the propagation delay device and the inter-burst timing device to enable the transmitter to transmit a burst of data to be received by the mobile burst radar during the inter-burst period; and
a receiver disposed in the mobile radar transceiver and configured to receive during different inter-burst periods reflections of radar bursts transmitted from the mobile radar transceiver and receive data transmitted from the communications terminal.

21. A means for transmitting bursts of data from a communications terminal to a mobile radar transceiver having inter-burst periods, comprising:
a determining means for determining a propagation time between the communications terminal and mobile radar transceiver;
a timing means for establishing a length of inter-burst periods of the mobile radar transceiver having an inter-burst timing;
a transmission means disposed within the communications terminal for transmitting bursts of data having a length less than or equal to the length of the inter-burst periods from the communications terminal at a transmission time based on the inter-burst timing and the propagation time to enable each burst of data to be received by the mobile radar transceiver during one of the inter-burst periods; and
a reception means disposed within the mobile radar transceiver for receiving reflections of radar bursts transmitted from the mobile radar transceiver and receiving the burst of data from the communications terminal during different inter-burst periods.

* * * * *